United States Patent Office 3,810,881
Patented May 14, 1974

3,810,881
PEPTIDES HAVING D-α-PHENYLGLYCINE, L-LYSINE AND L-ORNITHINE IN POSITIONS 1, 17 AND 18, RESPECTIVELY
Werner Rittel, Basel, and Max Brugger, Birsfelden, Switzerland, assignors to Ciba-Geigy Corporation, Ardsley, N.Y.
No Drawing. Filed June 7, 1972, Ser. No. 260,554
Claims priority, application Switzerland, June 18, 1971, 8,932/71
Int. Cl. C07c 103/52; C07g 7/00
U.S. Cl. 260—112.5                                5 Claims

ABSTRACT OF THE DISCLOSURE

Peptides and peptide amides containing 18–39 aminoacids of the N-terminus of natural corticotropins, but in which the first aminoacid is replaced by D-α-phenylglycine and the aminoacids in the positions 17 and 18 are replaced by L-lysine or L-ornithine, and analogues of these compounds.

---

The present invention relates to peptides having an improved and extended adrenocorticotropic activity and containing 18 to 39 aminoacids of the N-terminus of natural corticotropins, but in which the first aminoacid, serine, is replaced by D-α-phenylglycine (shortened to D-α-Phg) and the aminoacids in positions 17 and 18 are replaced by L-lysine or L-ornithine, as well as analogues of these peptides which contain instead of the serine residue in position 3 the residue of glycine and/or instead of the methionine residue in position 4 an L-α-lower alkyl-α-aminoacetyl residue, such as the residue of L-norleucine, L-norvaline, L-leucine, L-valine, or of α-aminobutyric acid and/or instead of the glutamic acid residue in position 5 the residue of glutamine and/or instead of the residue in position 25 the residue of L-valine, as well as C-terminal amides of these peptides, and acid addition salts and complexes of these compounds. It has been observed that the new peptides have a stronger and longer adrenocorticotropic activity than the known ACTH-active peptides. Special mention deserve the peptides and N-terminal peptide-amides containing 18 to 25 aminoacids, in the first place D-α-Phg$^1$-Lys$^{17,18}$-β1—18-corticotropin-Lys$^{18}$-amide and D-α-Phg$^1$-Lys$^{17,18}$-β1—24-corticotropin and its C-terminal amide.

Acid addition salts are especially salts of therapeutically tolerated acids such as hydrochloric or acetic acid, or in the first place sparingly soluble salts such as sulphates, phosphates, sulphonates or higher alkanoates, for example stearates.

The term complexes describes the complex-like compounds whose structure has not yet been determined and which are formed when certain inorganic or organic substances are added to adrenocorticotropically active peptides, and principally those which prolong the activity of the peptides. Such inorganic substances are compounds derived from metals, such as calcium, magnesium, aluminum, cobalt or especially zinc, in the first place sparingly soluble salts, such as phosphates, pyrophosphates and polyphosphates as well as hydroxides of these metals; also alkali metal polyphosphates, for example Calgon N, Calgon 322, Calgon 188 or Polyron B 12. Organic substances that prolong the activity are, for example, nonantigenic gelatin, for example oxypolygelatin, polyvinylpyrrolidone and carboxymethylcellulose; furthermore sulphonic or phosphoric acid esters of alignic acid, dextran, polyphenols and polyalcohols, especially polyphloretine phosphate and phytic acid, as well as polymers of aminoacids, for example protamine, polyglutamic acid or polyaspartic acid.

The new compounds have a considerable and prolonged adrenocorticotropic activity, for example in the test according to Desaulles and Rittel (Memoirs of the Soc. for Endocrinology 1968, No. 17, pages 124–137), in which the excretion of corticosterone from the suprarenal glands of hypophysectomized rats after subcutaneous injection of the peptide is measured. The new compounds can therefore be used as medicaments in place of the natural corticotropins.

According to the process of this invention for the manufacture of the new compounds, the protective groups are eliminated from protected peptides or peptide-amides containing 18 to 39 aminoacids of the N-terminus of the natural corticotropins, but in which the first aminoacid is replaced by D-α-phenylglycine and the aminoacids in positions 17 and 18 are replaced by L-lysine or L-ornithine, or analogues of these compounds in which one or several of the aminoacids in positions 3 to 5 and 25 are replaced by other α-aminoacids, and, if desired the resulting compounds are converted into their acid addition salts or complexes.

Protective groups for the starting materials and for the requisite intermediates in the synthesis of the starting materials are the groups known for use in the peptide synthesis, especially those which are known for the synthesis of ACTH-sequences, principally those which can be eliminated by means of strong inorganic or organic acids, for example hydrohalic acids such as hydrochloric or hydrofluoric acid, or trifluoroacetic acid. As amino-protective groups there may be mentioned, for example, possibly substituted aralkyl groups such as diphenylmethyl or triphenylmethyl groups, or acyl groups such as formyl, trifluoroacetyl, phthaloyl, para-toluenesulphonyl, benzylsulphenyl, benzenesulphenyl, ortho-nitrophenylsulphenyl or especially acyl groups derived from carbonic or thiocarbonic acid, such as carbobenzoxy groups whose aromatic residue may be substituted by halogen atoms, nitro groups, lower alkyl, lower alkoxy or lower carbalkoxy groups, for example carbobenzoxy, para-bromo- or para-chlorocarbobenzoxy, para-nitrocarbobenzoxy, para-methoxycarbobenzoxy, colored benzyloxycarbonyl groups such as para-phenylazobenzyloxycarbonyl and para-(para′-methoxyphenylazo)-benzyloxycarbonyl, tolyloxycarbonyl, 2-phenyl-isopropoxycarbonyl, 2-tolyl-isopropoxycarbonyl and especially 2-(para-biphenylyl)-2-propoxycarbonyl; furthermore aliphatic oxycarbonyl groups, for example allyloxycarbonyl, cyclopentyloxycarbonyl, tertiary amyloxycarbonyl, adamantyloxycarbonyl, 2,2,2-trichloroethyloxycarbonyl, 2-iodoethoxycarbonyl and in the first place tertiary butoxycarbonyl.

The carboxyl groups are protected, for example, by amide or hydrazide formation or by esterification. For the esterification there may be used, for example, lower unsubstituted or substituted alkanols such as methanol, ethanol, cyanomethyl alcohol or especially tertiary butanol, also aralkanols such as aryl-lower alkanols e.g. possibily substituted benzyl alcohols such as para-nitrobenzyl alcohol or paramethoxybenzyl alcohol, phenols and thiophenols such as para-nitrothiophenol, 2,4,5-trichlorophenol, para-cyanophenol, or para-methanesulphonylphenol; furthermore, for example, N-hydroxysuccinimide and N-hydroxyphthalimide, N-hydroxypiperidine and 8-hydroxyquinoline.

The hydroxyl groups of the side-chains, for example of the serine and/or tyrosine residues may be protected, for example, by etherification, for example with benzyl alcohol or preferably with tertiary butanol, but they need not necessarily be protected. For the protection of the amino group in the guanidino grouping of arginine there are preferably used the nitro group or the tosyl group, but it is not absolutely necessary to protect the guanidino group. Likewise, the imino group of histidine need not necessarily be protected, but it may be advantageous to protect it, for example by benzyl, trityl, adamantyloxycarbonyl or by the 2,2,2-trifluoro-1-tert. butoxycarbonylaminoethyl or -1-benzyloxycarbonylaminoethyl groups described in Ber. 100 [1967], pages 3838–3849. The protective groups are eliminated in the known manner by hydrogenolysis or hydrolysis, especially acid hydrolysis, in a single step or if desired in several steps.

It is preferable to use a starting peptide in which the amino groups of the side-chains are protected by the tert. butoxycarbonyl group and the carboxyl groups of the side-chain and of the C-terminal acid—if they are not amidated—by the tert.butyl ester group. These groups are advantageously eliminated with trifluoroacetic acid, hydrochloric acid or hydrofluoric acid.

The starting peptides are manufactured by linking the aminoacids singly in the desired sequence or after the prior formation of smaller peptide units.

The aminoacid and/or peptide units are so linked that an aminoacid or a peptide containing a protected α-amino group and an activated terminal carboxyl group is reacted with an aminoacid or a peptide containing a free α-amino group and a free or protected, for example esterified or amidated, terminal carboxyl group; or an aminoacid or a peptide containing an activated α-amino group and a protected terminal carboxyl group is reacted with an aminoacid or a peptide containing a free terminal carboxyl group and a protected α-amino group. The carboxyl group may be activated, for example, by conversion into an acid azide, acid anhydride, acid imidazolide or isoxazolide or an activated ester such as cyanomethyl ester, carboxymethyl ester, para-nitrophenyl ester, 2,4,5-trichlorophenyl ester, pentachlorophenyl ester, N-hydroxysuccinimide ester, N-hydroxyphthalimide ester, 8-hydroxyquinoline ester, N-hydroxypiperidine ester, or by reaction by means of a carbodiimide (possibly with addition of N-hydroxysuccinimide or 1-hydroxybenzotriazole which may be unsubstituted or substituted, for example, by halogen, methyl or methoxy) or of an N,N'-carbonyldiimidazole, the amino group for instance by reaction with a phosphiteamide. As the most frequently used methods there may be mentioned the carbodiimide method, the azide method, the method of the activated esters and the anhydride methods, as well as Merrifield method.

Any free functional groups that do not participate in the reaction are advantageously protected, especially by residues that are easy to eliminate by hydrolysis or by reduction, as mentioned above.

Depending on the reaction conditions employed the new compounds are obtained in form of bases or of their salts. From the salts the bases can be prepared in the known manner. When the bases are reacted with acids capable of forming therapeutically useful salts, salts are obtained, for example salts with inorganic acids, such as hydrohalic acids, for example hydrochloric of hydrobromic acid, perchloric, nitric or thiocyanic acid, sulphuric or phosphoric acid, or organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicyclic, 4-aminosalicylic, 2-phenoxybenzoic, 2-acetoxybenzoic, methansulphonic, ethanesulphonic, hydroxyethanesulphonic, benzenesulphonic, paratoluenesulphonic, naphthalenesulphonic or sulphanilic acid.

The peptides obtained according to this invention can be used in the form of pharmaceutical preparations which contain the peptides in admixture with an organic or inorganic pharmaceutical excipient suitable for intravenous, intramuscular, subcutaneous or intranasal administration. Suitable excipients are substances that do not react with the polypeptides, for example gelatin, lactose, glucose, starches, cellulose, for example "Avicel" (microcrystalline cellulose) and cellulose derivatives such as carboxymethylcellulose, methyl- or ethylcellulose, talcum, magnesium stearate, gums, polyalkyleneglycols, water, mono- or polyhydric alcohols such as ethanol, isopropanol, glycerol, hexitols, vegetable oils and other fatty acid esters such as arachis oil, cottonseed oil, almond oil, olive oil, castor oil, ethyloleate, isopropylmyristate, isopropylpalmitate, "Cetiol V" (oleic acid ester of liquid aliphatic alcohols), "Miglyol" or "Labrafac" (triglyceride mixture of fatty acids containing 8 to 12 carbon atoms), "Labrafil M 2735" or "Labrafac WL 1219" (mixtures of glycerol and polyoxyethylene fatty acid esters), "Arlacel" (sorbitan fatty acid ester), "Tween" (polyoxylethylene-sorbitan monooleate) or other medicinal excipients. The pharmaceutical preparations may be, for example, tablets, coated pills or capsules, or in liquid form solutions, suspensions or emulsions. They may be sterilized and/or contain adjuvants such as preserving, stabilizing, wetting or emulsifying agents. They may also contain further therapeutically valuable substances.

For therapeutic purposes the peptide is used in an amount ranging from 0.01 to 3 mg. in solution or suspension, for example as a zinc complex suspension or as a gelatin solution or polyphloretine phosphate solution. Of the solutions or suspensions 0.1 to 5 ml. an administered, for example, intravenously, intramuscularly, subcutaneously or intranasally. The medicament may be given, for example, once to three times daily or several times per week. The free peptide is preferably administered intravenously or intramuscularly, the complexes, for example zinc complexes, preferably intramuscularly or subcutaneously.

The following examples illustrate the invention. The following abbreviations are used:

BOC=tertiary butoxycarbonyl
Z=carbobenzoxy
But=tertiary butyl
OSu=N-hydroxysuccinimide ester In thin-layer chromatography the following systems and plates were used:

SYSTEM

43A=tert.amyl alcohol+isopropanol+water (100:40:10)
43C=tert.amyl alcohol+isopropanol+water (51:21:28)
43E=tert.amyl alcohol+isopropanol+water (32:32:36)
45=sec.butanol+3% aqueous ammonia (70:30)
52=n-butanol+glacial acetic acid+water (75:7.5:21)
89=ethyl acetate+acetone+water (72:24:4)
101=n-butanol+pyridine+glacial acetic acid+water (38:24:8:30)
102A=ethyl acetate+methylethylketone+formic acid+water (50:30:10:10)
102E=ethyl acetate+methylethylketone+glacial acetic acid+water (50:30:10:10)
111A=n-butanol+pyridine+concentrated ammonia+water (42:24:4:30)
111B=n-butanol+pyridine+concentrated ammonia+water (40:24:6:30)
111C=n-butanol+pyridine+concentrated ammonia+water (38:24:8:30)

PLATE (S)=silica gel, ready plates SL 254, makers Messrs. Antec, Birsfelden, BL, Switzerland
(A)=alumina D–O of Messrs. Camag (with 8% of gypsum)
(C)=cellulose, "Avicel" ready plates 1440, of Messrs. Schleicher and Schuell.

EXAMPLE 1

H-D-α-Phg-Tyr-Ser-Met-Glu-His-Phe - Arg - Trp-Gly-Lys-Pro-Val-Gly-Lys-Lys-Lys-Lys-$NH_2$ (D-α-$Phg^1$-$Lys^{17,18}$-β-$1-18$-corticotropin-$Lys^{18}$-amide)

225 mg. of BOC-D-α-Phg-Tyr-Ser-Met-Glu(OtBu)-His-Phe-Arg-Trp-Gly-Lys(BOC)-pro - Val - Gly-Lys(BOC)-

Lys(BOC)-Lys(BOC)-NH₂ are dissolved at 0° C. under nitrogen in 40 ml. of trifluoroacetic acid of 95% strength and the solution is kept for 2 hours at room temperature. The solution is then stirred into 500 ml. of peroxide-free ether cooled to 0° C., and the floccular precipitate formed is filtered off and washed with ether. For converting the octadecapeptide-amide trifluoroacetate into the acetate the product is dissolved in 10 ml. of water and percolated through a column (2.0 x 18 cm. of Amberlite CG–45 (weakly basic ion exchange resin) in the acetate form.

Those fractions of the eluate, which according to the percolate analysis contain the above-mentioned product, are lyophilized to furnish a white lyophilizate.

In thin-layer chromatograms the product reveals the following $R_f$ values: $R_f(A)=0.40$ (101), $R_f(A)=0.30$ (111B), $R_f(C)=0.31$ (101), $R_f(C)=0.42$ (111A).

In electrophoresis on cellulose the substance migrates at pH 1.9 (acetic acid+formic acid buffer) at 200 volts in 1½ hours 8.5 cm. towards the cathode; at pH 4.75 (ammonium acetate buffer) 200 volts in 1½ hours: 5.7 cm. towards the cathode.

Ultraviolet (0.1 N NaOH) $\lambda_{max}=281$ nm. ($\epsilon=5400$) and 288 nm. ($\epsilon=5250$)

The starting material may be prepared thus:

(1) BOC-D-α-Phg-OSu.—100 grams of BOC-D-α-Phg-OH-cyclohexylammonium salt in chloroform are converted with citric acid into the free acid, which is dissolved in 1 liter of acetonitrile and 36.4 g. of N-hydroxysuccinimide. Then a solution of 65 g. of dicyclohexylcarbodiimide in 400 ml. of acetonitrile is added at 0° C., the mixture is stirred for 1 hour at 0° C. and for 16 hours at room temperature, cooled with ice water and the precipitated dicyclohexylurea is filtered off; the filtrate is treated with active carbon and the product crystallized from acetonitrile+ether+hexane. The product is thus obtained in the form of fine needles melting at 155–158° C.

(2) BOC-D-α-Phg-Tyr-Ser-Met-OCH₃.—6.0 grams of BOC-D-α-Phg-OSu and 6.4 g. of H-Tyr-Ser-Met-OCH₃ are dissolved under nitrogen in 75 ml. of absolute dimethylformamide and the solution is kept for 20 hours at room temperature. The solution is then reduced under vacuum to about half its volume and stirred into 400 ml. of ether cooled to 0° C. The product is obtained as an amorphous powder melting at 130–135° C.; $R_f(S)=0.54$ (89), $R_f(S)=0.68$ (43A), $R_f(S)=0.50$ (chloroform+methanol 9:1).

(3) BOC-D-α-Phg-Tyr-Ser-Met-NH-NH₂.—3.0 grams of BOC-D-α-Phg-Tyr-Ser-Met-OCH₃ are dissolved under nitrogen in 30 ml. of methanol and at 0° C. mixed with 3.5 ml. of hydrazine hydrate, and the whole is kept for 21 hours in a refrigerator, whereupon a thick paste has settled out; it is agitated with 10 ml. of a 1:2-mixture of methanol and ether, then filtered and dried, to furnish 2.8 g. of an amorphous product melting at 191° C. with decomposition. $[\alpha]_D^{20}=-11°$ (c.=2.0 in dimethylformamide). $R_f(S)=0.60$ (43A), $R_f(S)=0.74$ (102E), $R_f(S)=0.25$ (chloroform+methanol 85:15).

(4) BOC - D - α - Phg-Tyr-Ser-Met-Glu(OtBu)-His-Phe-Arg-Trp-Gly-OH.—A suspension of 2.2 g. of BOC-D-α-Phg-Tyr-Ser-Met-NH-NH₂ in 20 ml. of acetonitrile is turned into a clear solution at −18° C. by adding 6.7 ml. of aqueous 2 N-hydrochloric acid. At −14° C. 350 mg. of sodium nitrite dissolved in 2 ml. of water are added and the mixture is stirred for 15 minutes at −10° C. while diluting it at the same time with 20 ml. of acetonitrile, then cooled to −15° C., 5.3 ml. of 2 N-sodium carbonate solution and 2.5 g. of sodium chloride are added and the aqueous phase is separated and further extracted with 2× 5 ml. of acetonitrile. The cold acetonitrile phases are immediately added to 2.69 g. of H-Glu(OtBu)-His-Phe-Arg-Trp-Gly-OH which, together with 0.44 ml. of N,N-diisopropylethylamine, had first been dissolved in 70 ml. of dimethylformamide and 2 ml. of water and then cooled, and the whole is stirred for 4 hours at 0° C. and then for 20 hours at room temperature.

The precipitated product is filtered off and recrystallized from acetonitrile+water 1:1, to furnish a white powder melting at 210° C. with decomposition. $R_f(S)=0.53$ (43E), $R_f(S)=0.34$ (52), $R_f(S)=0.27$ (45).

(5) BOC-D-α-Phg-Tyr - Ser - Met-Glu(OtBu) - His-Phe-Arg-Trp-Gly - Lys(BOC) - Pro - Val-Gly-Lys(BOC)-Lys(BOC) - Lys(BOC) - Lys(BOC)-NH₂.—1.20 mg. of BOC-D-α-Phg - Tyr - Ser - Met-Glu(OtBu)-His-Phe-Arg-Trp-Gly-OH and 40 ml. of absolute dimethylformamide are dissolved with 0.28 ml. of 3 N-hydrochloric acid in dioxane and stirred under nitrogen with 1.13 g. of H-Lys(BOC) - Pro - Val - Gly - Lys(BOC) - Lys(BOC)-Lys(BOC)-Lys(BOC)-NH₂. Then 162 mg. of N-hydroxybenztriazole and 247 mg. of dicyclohexylcarbodiimide are added and the mixture is stirred for 19 hours at 40° C., then stirred into 500 ml. of peroxide-free ether at 0° C. and the precipitate is filtered off. The crude product is subjected to multiplicative distribution over 750 steps in the system methanol+buffer+chloroform+carbon tetrachloride (10:3:7:4; Buffer: 119.3 g. of ammonium acetate, 28.6 ml. of glacial acetic acid, 1 liter of water) $[r_{max}=54, K=0.47$ at 22° C. and phase volumes of 10 ml. each]. $R_f(S)=0.51$ (43A), $R_f(S)=0.51$ (52), $R_f(S)=0.54$ (102A).

EXAMPLE 2

D-α-Phg-Tyr-Ser-Met-Glu-His-Phe-Arg-Trp-Gly-Lys-Pro-Val-Gly-Lys-Lys-Lys-Lys-Pro-Val-Lys-Val-Tyr-Pro-OH (D-α-Phg¹ - Lys¹⁷,¹⁸-β¹⁻²⁴ - corticotropin.—275 mg. of BOC-D-α-Phg - Tyr - Ser - Met - Glu(OtBu) - His - Phe-Arg-Trp-Gly-Lys(BOC) - Pro - Val - Gly - Lys(BOC)-Lys(BOC) - Lys(BOC) - Lys(BOC)-Pro-Val-Lys(BOC)-Val-Tyr-Pro-OtBu are dissolved at 0° C. in 25 ml. of trifluoroacetic acid of 90% strength and kept for 2 hours at room temperature under nitrogen. The solution is then stirred into 300 ml. of peroxide-free ether and the precipitate filtered off and washed with ether; the substance is dissolved in a small quantity of water and percolated through a column (1.8 x 16 cm.) of Amberlite CG–45 (weakly basic ion exchange resin) in the acetate form. The fractions of the eluate which according to the ultraviolet through-flow analysis contain the product are lyophilized and furnish a white, amorphous lyophilizate. $R_f(A)=0.31$ (101B), $R_f(A)=0.41$ (111C), $R_f(C)=0.41$ (101).

Ultraviolet (0.1 N—NaOH): $\lambda_{max}=282$ ($\epsilon=6900$), 289 ($\epsilon=7200$)

In electrophoresis the compound migrates towards the cathode on cellulose plates at 200 volts in 1½ hours: 7.2 cm. at pH 1.9 (acetic acid+formic acid buffer) and 5.1 cm. at pH 4.75 (ammonium acetate buffer).

The starting compound may be prepared thus:

BOC-D-α-Phg-Tyr-Ser - Met - Glu(OtBu) - His-Phe-Arg-Trp-Gly-Lys(BOC) - Pro - Val - Gly - Lys(BOC) - Lys(BOC)-Lys(BOC)-Lys(BOC) - Pro - Val - Lys(BOC)-Val-Tyr-Pro-OtBu

A mixture of 750 mg. of BOC-D-α-Phg-Tyr-Ser-Met-Glu(OtBu)-His - Phe - Arg - Trp-Gly-OH in 18 ml. of absolute dimethylformamide and 0.17 ml. of 3 N-hydrochloric acid in dioxane is stirred for 10 minutes. First 1.06 g. of H-Lys(BOC) - Pro - Val - Gly - Lys(BOC) - Lys (BOC) - Lys(BOC) - Lys(BOC) - Pro - Val - Lys(BOC)-Val-Tyr-Pro - OtBu, then 104 mg. of N-hydroxybenztriazole and 180 ml. of dicyclohexylcarbodiimide are added and the mixture is stirred for 20 hours at room temperature. The batch is then stirred into 400 ml. of peroxide-free, ice-cold ether and the product, which has settled out in amorphous form, is filtered off and for further purification subjected to a multiplicative counter-current distribution over 800 steps. The pure substance reveals a K-value of 0.18 at 22° C. (phase volume: 10 ml. each).

$R_f$ (S)=0.71 (43C), $R_f$ (S)=0.46 (45), $R_f$ (S)=0.50 (102A).

EXAMPLE 3

A suspension is prepared from the following components:

|  | Mg. |
|---|---|
| D-α-Phg$^1$-Lys$^{17,18}$-β$^{1-18}$-corticotropin-Lys$^{18}$-amide | 1.0 |
| ZnCl$_2$ | 5.25 |
| Na$_2$HPO$_4$·2H$_2$O | 1.05 |
| NaCl | 2.0 |
| Benzyl alcohol | 10.0 |

0.6-n. NaOH to pH 8.0.
Distilled water to 1.0 ml.

EXAMPLE 4

A suspension is prepared from the following components:

|  | Mg. |
|---|---|
| D-α-Phg$^1$-Lys$^{17,18}$-β$^{1-18}$-corticotropin-Lys$^{18}$-amide | 1.0 |
| ZnCl$_2$ | 4.20 |
| Na$_2$HPO$_4$·2H$_2$O | 1.26 |
| NaCl | 1.5 |
| Benzyl alcohol | 10.0 |

NaOH to pH 8.0.
Distilled water to 1.0 ml.

EXAMPLE 5

A suspension is prepared from the following components:

|  | Mg. |
|---|---|
| D-α-Phg$^1$-Lys$^{17,18}$-β$^{1-18}$-corticotropin-Lys$^{18}$-amide | 1.0 |
| Sodium polyphosphate "Calgon 322" (degree of condensation 15–30) | 2.0 |
| NaCl | 9 |

Distilled water to 1 ml.

EXAMPLE 6

An injection solution is prepared from the following components:

|  | Mg. |
|---|---|
| D-α-Phg$^1$-Lys$^{17,18}$-β$^{1-18}$-corticotropin-Lys$^{18}$-amide | 0.50 |
| Glacial acetic acid | 1.22 |
| CH$_3$COONa·3H$_2$O | 0.607 |
| NaCl | 8.1 |

Distilled water to 1 ml.

EXAMPLE 7

A solution is prepared from the following components:

|  | Mg. |
|---|---|
| D-α-Phg$^1$-Lys$^{17,18}$-β$^{1-18}$-corticotropin-Lys$^{18}$-amide | 0.4 |
| 20% aqueous solution of oxypolygelatine with 0.5% phenol to 1 ml. |  |

EXAMPLE 8

A dry vial of the following compositions is prepared:

|  | Mg. |
|---|---|
| D-α-Phg$^1$-Lys$^{17,18}$-β$^{1-18}$-corticotropin-Lys$^{18}$-amide | 1.0 |
| Sodium polyphloretine phosphate (86.5%) | 23.2 |
| NaCl | 12.28 |

Double distilled water (2 ml.) is used as solution ampoule.

EXAMPLE 9

A nasal spray containing about 100 individual doses (1 mg. each) is prepared as follows:

100 mg. of finely ground D-α-Phg$^1$-Lys$^{17,18}$-β$^{1-18}$-corticotropin-Lys$^{18}$-amide are suspended in a mixture of 75 mg. of benzyl alcohol and 1.395 g. of "Miglyol" 812 (triglyceride of fatty acids containing 8–12 carbon atoms). Aluminium monobloc containers (10 ml. capacity) are filled with this suspension and sealed with a dosage valve. Then 6.0 g. of Freon 12/114 (4060) are charged in under nitrogen pressure.

EXAMPLE 10

A dry vial of the following composition is prepared:

|  | Mg. |
|---|---|
| D-α-Phg$^1$-Lys$^{17,18}$-β$^{1-18}$-corticotropin-Lys$^{18}$-amide | 1.0 |
| Mannitol | 40.0 |

A physiological saline solution (2 ml.) is used as solution ampoule.

EXAMPLE 11

In Examples 1–10 D-α-Phg$^1$-Lys$^{17,18}$-β$^{1-24}$-corticotropin is used instead of D-α-Phg$^1$-Lys$^{17,18}$-β$^{1-18}$-corticotropin-Lys$^{18}$-amide.

We claim:

1. Peptides or peptide amides containing 18–25 aminoacids of the N-terminal sequence of natural corticotropins, but in which the first aminoacid is replaced by D-α-phenylglycine and the aminoacids in the positions 17 and 18 are replaced by L-lysine or L-ornithine, their acid addition salts and complexes with zinc phosphate, zinc pyrophosphate, alkali metal polyphosphate and/or zinc hydroxide.

2. A peptide amide as claimed in claim 1, said peptide amide being D-α-phenylglycyl$^1$-Lys$^{17,18}$-β$^{1-18}$-corticotropin-Lys$^{18}$-amide, the acid addition salts and complexes thereof with zinc phosphate, zinc pyrophosphate, alkali metal polyphosphate and/or zinc hydroxide.

3. A peptide as claimed in claim 1, said peptide being D-α-phenylglycyl$^1$-Lys$^{17,18}$-β$^{1-24}$-corticotropin, the acid addition salts and complexes thereof with zinc phosphate, zinc pyrophosphate, alkali metal polyphosphate and/or zinc hydroxide.

4. Complexes of the peptides or peptide amides claimed in claim 1 with zinc phosphate, zinc pyrophosphate and/or zinc hydroxide.

5. Complexes of the peptides or peptide amides claimed in claim 1 with alkali metal polyphosphates.

References Cited

UNITED STATES PATENTS 3,388,112   6/1968   Geiger et al. _____ 260—112.5

OTHER REFERENCES

Hofmann et al.: J. Med. Chem., 13, 339 (1970).
Fujino et al.; Chem. Pharm. Bull., 18, 1288 (1970).
Brugger et al.: Experentia, 26, 1050 (1970).

LEWIS GOTTS, Primary Examiner

R. J. SUYAT, Assistant Examiner

U.S. Cl. X.R.

424—179